(12) United States Patent
Blake et al.

(10) Patent No.: US 7,614,561 B2
(45) Date of Patent: Nov. 10, 2009

(54) SCANNER FLIPPER OSCILLATION FREQUENCY DETECTION AND ADJUSTMENT THEREOF

(75) Inventors: Robert E. Blake, Woodbury Heights, NJ (US); Donald T. Hudrick, Sicklerville, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 400 days.

(21) Appl. No.: 11/303,860

(22) Filed: Dec. 16, 2005

(65) Prior Publication Data

US 2007/0138276 A1    Jun. 21, 2007

(51) Int. Cl.
*G06K 9/22* (2006.01)

(52) U.S. Cl. .............................. 235/462.45; 235/472.1

(58) Field of Classification Search ............ 235/462.45, 235/472.1, 462.43, 462.36, 462.4
See application file for complete search history.

(56) References Cited

U.S. PATENT DOCUMENTS

| | | | |
|---|---|---|---|
| 4,251,798 A | 2/1981 | Swartz et al. | |
| 4,805,175 A | 2/1989 | Knowles | |
| 5,422,469 A | 6/1995 | Bard et al. | |
| 5,508,503 A * | 4/1996 | Scofield et al. | 235/462.36 |
| 5,581,067 A | 12/1996 | Grosfeld et al. | |
| 5,693,929 A | 12/1997 | Dvorkis et al. | |
| 5,705,799 A | 1/1998 | Li | |
| 5,821,521 A | 10/1998 | Bridgelall et al. | |
| 6,227,450 B1 | 5/2001 | Blake et al. | |
| 6,283,372 B1 | 9/2001 | Li | |
| 6,348,773 B1 | 2/2002 | Dvorkis et al. | |
| 6,484,944 B1 * | 11/2002 | Manine et al. | 235/462.38 |
| 6,575,370 B1 | 6/2003 | Dvorkis et al. | |
| 6,929,184 B2 | 8/2005 | Barkan | |

OTHER PUBLICATIONS

U.S. Appl. No. 11/291,492, filed Nov. 30, 2005, Blake et al.

* cited by examiner

*Primary Examiner*—Edwyn Labaze
(74) *Attorney, Agent, or Firm*—Glenn A. Cavanaugh

(57) ABSTRACT

A scanner flipper oscillation frequency analyzing method, computer-readable medium, and apparatus is provided. In one embodiment, the method turns a laser off if the laser is on and receives a signal indicative of a flipper oscillation frequency. The method then compares the signal with stored parameters. Based on the comparison, the method adjusts the flipper oscillation frequency when a percentage variation between the signal and the parameters is above a predetermined value. If the flipper oscillation frequency is adjusted a Digital-to-Analog Conversion value associated with the adjustment is stored in memory. The signal received can be transition signals. In other embodiments, an apparatus and computer-readable medium is also provided which performs the similar features recited by the above method.

28 Claims, 4 Drawing Sheets

SCANNER FLIPPER OSCILLATION FREQUENCY DETECTION AND ADJUSTMENT THEREOF

BACKGROUND OF THE INVENTION

1. Field of the Invention

Embodiments of the present invention generally relate to laser scanning systems and more particularly, to determining the oscillation frequency of a scanning flipper and adjusting the flipper's oscillation frequency in electronically-controlled damped off-resonant laser based symbol scanning mechanisms.

2. Description of the Related Art

One commonly used beam scanning technique involves driving a resonant element bearing a mirror into oscillatory motion within a plane, while a laser beam is directed incident the mirror surface. As the resonant element oscillates, so too does the mirror, causing the incident laser beam to be scanned across a scanning field of substantially planar extent, as well as a bar code symbol disposed therewithin. Some scanning mechanisms utilize strips made of MYLAR® or KAPTON® plastic material to realize resonant scanning elements.

In general, laser light reflected from the scanned bar code symbol is collected and detected to produce an electrical signal representative of the scanned symbol. Ultimately, the electrical signal is processed in order to decode the scanned symbol and produce symbol character data representative of the decoded symbol.

A benchmark oscillation frequency is set during production. However, during use the actual oscillation frequency of the scanner may deviate from the benchmark oscillation frequency. When a significant deviation from the benchmark frequency occurs, the scanner will not transmit or receive information properly.

Therefore, there is a great need in the art for an improved laser scanning mechanism which avoids the shortcomings and drawbacks of prior art laser beam scanning apparatus and methodologies.

SUMMARY OF THE INVENTION

These and other deficiencies of the prior art are addressed by the present invention which generally relates to laser scanning systems and more particularly, to maintaining a flipper oscillation frequency in electronically-controlled damped off-resonant laser based symbol scanning mechanisms. In one embodiment, a method turns a laser off if the laser is on and receives a signal indicative of a flipper oscillation frequency. The method then compares the signal with stored parameters. Based on the comparison, the method adjusts the flipper oscillation frequency when a percentage variation between the signal and the parameters is above a predetermined value. If the flipper oscillation frequency is adjusted, a Digital-to-Analog Conversion value associated with the adjustment is stored in memory. The signal received can be transition signals. Embodiments which encompass an apparatus and a computer-readable medium which perform functions similar to the above described method are also provided.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

For illustrative purposes only, the invention is described with respect to a KAPTON® based scanner flipper; however, that depiction is not intended in any way to limit the scope of the invention. Further, for illustrative purposes, the invention has been described with respect to KAPTON® based scanner models produced by Metrologic, Instruments, Inc. of Blackwood N.J. However, it is appreciated that the invention is not limited to the scanner models disclosed herein. This document incorporates by reference all of the material disclosed within commonly owned and assigned U.S. Pat. No. 6,227,450 issued May 8, 2001 and entitled ELECTRONICALLY-CONTROLLED MECHANICALLY-DAMPED OFF-RESONANT LIGHT BEAM SCANNING MECHANISM AND CODE SYMBOL READERS EMPLOYING THE SAME as if being set forth in its entirety herein. In addition, this document incorporates by reference all of the material disclosed in co-pending U.S. application Ser. No. 11/291,492 filed Nov. 30, 2005 and entitled SCANNER FLIPPER INTEGRITY INDICATOR as if being set forth in its entirety herein.

The exemplary scanner disclosed herein is capable of periodic oscillation frequency adjustment. An added advantage of the ability to periodically check and adjust the actual oscillation frequency of the scanner is increased scanner quality control.

Figure 1:
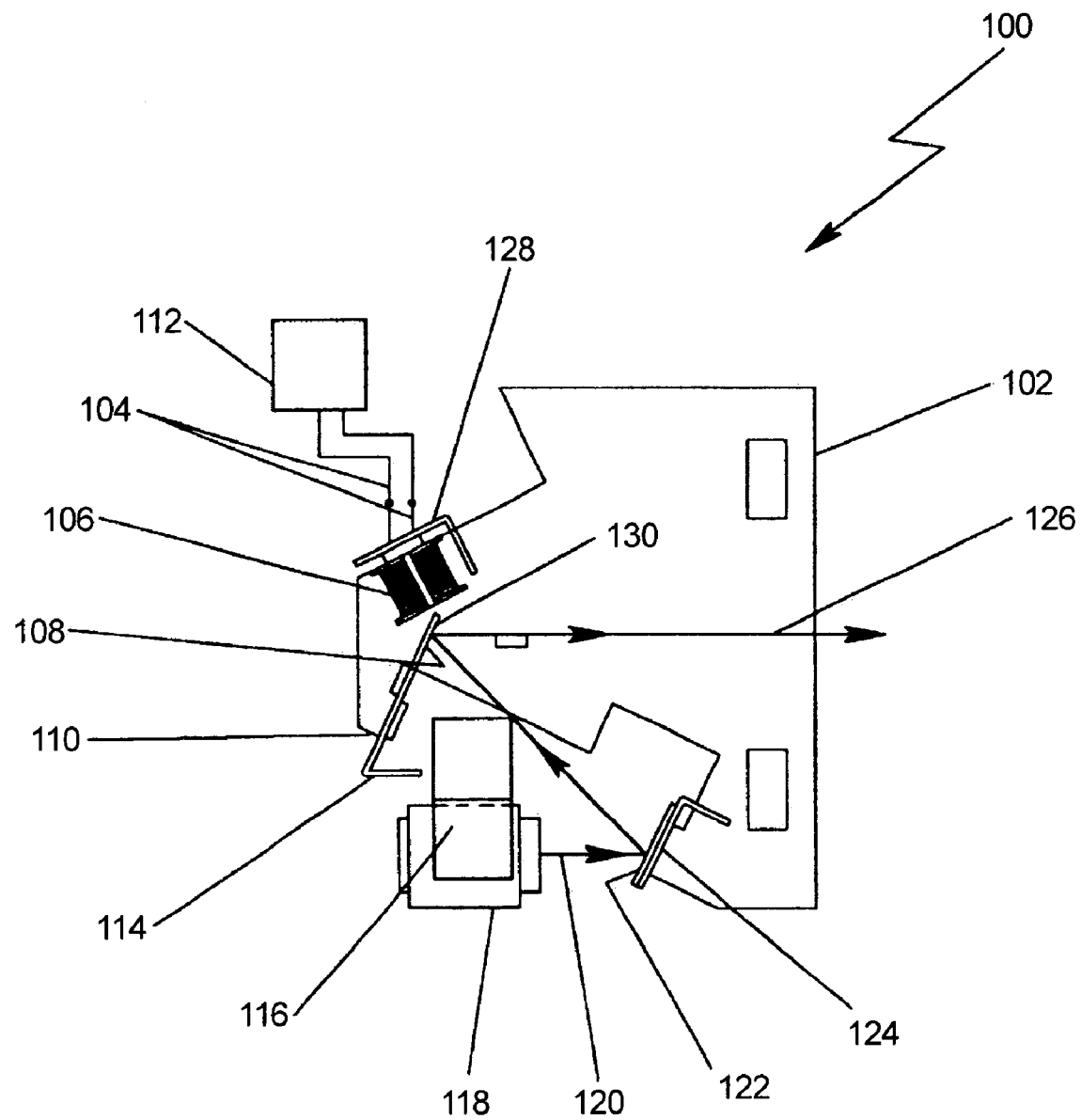
FIG. 1 is a perspective view of an embodiment of an apparatus used in accordance with the invention.
Figure 2:
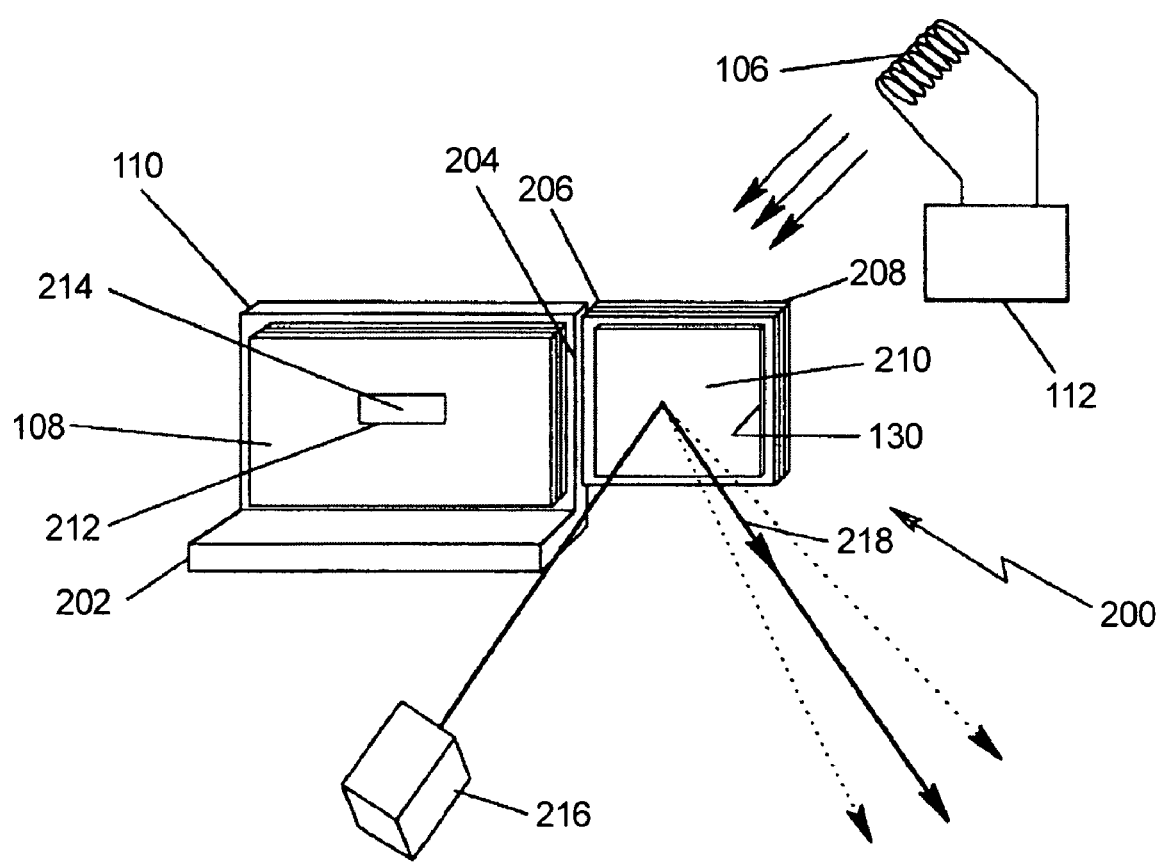
FIG. 2 is a perspective view of a flipper element depicted in FIG. 1.

FIGS. 1 and 2 describe the scanning operation of a flipper (and also the flipper in scan ready mode) based scanner. Other scanner/flipper configurations may be used in accordance with embodiments of the invention. In FIG. 1, a laser beam scanning mechanism of an illustrative embodiment is depicted on an optical bench 102 of planar dimensions. Magnetic-field producing coil (i.e., electromagnetic coil) 106 is supported upon a first projection (e.g., bracket) 128 which extends from the optical bench 102. The scanning element (i.e., the flipper) of the present invention described above is mounted upon a second projection 114 which extends from the optical bench 102. A permanent magnet 208 is placed in close proximity with the magnetic-field producing coil 106, as shown in FIG. 2. A visible laser diode (VLD) 118 is mounted adjacent the scanning element (by way of bracket 116) so that its output laser beam 120 is directed towards a beam folding mirror 122, supported from a third projection (bracket) 124 extending from the optical bench 102. The laser beam reflected off the beam folding mirror 122 is directed towards the laser beam deflecting portion 130 of the scanning element and reflects outwardly along the projection axis 126 of the scanning module. In one embodiment, the flipper is forced into oscillatory motion by driving the electromagnetic coil 106 with a voltage signal having a frequency other than the resonant frequency of the scanning element (e.g., about 3-4 Hz below resonance).

Illustratively, the electromagnetic coil 106 is driven in a push-pull mode, in which the magnetic polarity of the coil 106 reverses periodically at a rate determined by the amplitude variation of the voltage signal applied across the terminals 104 of the electromagnetic coil 106.

In various embodiments, the oscillation frequency of the flipper determines the scan rate of the laser scanning module. For example, during the design and manufacturing stage, the flipper's sweep is determined and calibrated. The flipper configuration (e.g., the components used to make the flipper, the weight of the flipper, and the dimensions of the flipper) can be used to construct a flipper with a specific resonant frequency/frequency range. The flipper is then tuned (i.e., driven) to a desired oscillation frequency (e.g., about 3-4 Hz below the resonant frequency). The tuning can be accomplished in numerous ways. For example, the desired frequency of the scanning mechanism is set by adjusting the frequency of the drive current signal in coil 106. A Digital-to-Analog Converter ("DAC") is used to maintain the desired flipper sweep. Illustratively, the stored DAC value is in a look-up table in memory (e.g., Electrically Erasable Programmable Read Only Memory ("EEPROM")). These stored values are also referred to herein as benchmark parameters/values.

The scanning mechanism of the present invention can be designed to provide scan rates higher than 250 scan lines per second (e.g., by using a thicker polyamide layer and/or narrowing the gap region of the scanning element). Sometimes, however, there are circumstances which can cause the actual oscillation frequency of the flipper to oscillate at a rate other than the desired oscillation frequency/frequency range. For example, temperature variations (or other atmospheric conditions) in the scanner can cause the actual oscillation frequency to fall outside of the desired operating parameters.

To insure that the actual oscillation frequency of the flipper is oscillating at the desired oscillation frequency, the oscillation pulse width of the flipper is determined and compared with the benchmark parameters (e.g., DAC value(s), time stamps, and desired pulse width(s)) stored in memory. If needed, the actual oscillation frequency is adjusted. Determination (and adjustment if needed) of the actual oscillation frequency of the flipper can be initiated under a number of circumstances. For example, the determination (and adjustment) can be initiated when the scanner is turned on; when the scanner is turned off; and/or during predetermined time intervals.

If a percentage variation between the benchmark parameters and the actual oscillation frequency is within established parameters, oscillation frequency (and corresponding DAC value) is not adjusted. If the percentage is greater than the established parameters, the DAC value representing the actual flipper sweep must be readjusted in a proportional manner to the adjustment in the actual oscillation frequency (i.e., if the resonance goes up, the DAC value goes up). The new DAC value is then stored and used to maintain the flipper's sweep.

In FIG. 2, the illustrative flipper 200 is shown having a base portion 108 mounted (i.e., anchored) on a support structure 110 of an optical bench 202, and a laser beam deflecting portion 130 extending from the base portion 108, with a flexible gap portion 206 disposed therebetween. As shown, the laser beam deflecting portion 130 bears a light deflecting element 210 on its front surface and a thin permanent magnet element 208 mounted on its rear surface. The light deflecting element 210 can be realized in a number of different ways, namely: as a light reflective element such as a mirror; as a light diffractive element such as a reflection or transmission hologram (i.e., HOE); as a light refractive element such as a lens element; or as any other type of optical element capable of deflecting a laser beam along an optical path as the laser beam deflecting portion 130 is oscillated about a fixed pivot point 204 defined at the interface between the anchored base portion and flexible gap portion of the scanning element. Light deflecting element 210 and magnetic element 208 can be mounted to the scanning element using an adhesive, or other fastening technique (e.g., soldering) well known in the art. In the illustrative embodiments disclosed herein, the laser beam deflecting portion 130 is oscillated about its fixed pivot point by producing a reversible magnetic force field (e.g., of about 260 Gauss) directed against the permanent magnet 8 (e.g., $20/1000$th thick) mounted on the rear surface of the laser beam deflecting portion.

In the illustrative embodiment, the positive polarity of the permanent magnetic field is directed away from the light deflecting element 210 on the laser beam deflecting portion 130. The interaction of magnetic fields of opposite polarity produced by the permanent ferrite-type magnet 208 and a stationary magnetic field producing electromagnet 106 causes the laser beam deflecting portion 130 to oscillate about its fixed pivot point 204 at both its natural resonant frequency of oscillation, its harmonic modes of oscillation, as well as at the driving or controlling frequency at which the polarity of the magnetic force field (produced by electromagnet 106) reverses in response to amplitude variations in the electrical pulse train (driving the electromagnetic coil) which occur at a frequency controlled by an electronic signal generation circuit 112.

Illustratively, the flipper 200 is a KAPTON® flipper which has a laminated construction, wherein: the anchored base portion 108 and the laser beam portion 130, each consist of a thin layer of KAPTON® polyamide sandwiched between a pair of thin layers of copper; and the flexible gap portion 206 consisting of the thin layer of KAPTON® (polyamide) plastic material. Notably, the thin layer of polyamide in the anchored base portion 110, the flexible gap portion 206 and the laser beam deflecting portion 130 is realized as a single unitary layer having a uniform thickness across these individual portions of the scanning element. The copper layers on opposite sides of the anchored base portion, the flexible gap portion and the laser beam deflecting portion of the scanning element are discrete elements of uniform thickness realized by precisely-controlled chemical-etching of the copper and polyamide layers during particular stages of the scanning element fabrication process described below.

Optionally, the flexible gap portion 206 may also include a thin layer of mechanically-damping film material, such as screenable silicone rubber (e.g., General Electric SLA 74015-D1), having a suitable durometer measure, (e.g., Shore A40).

Figure 3:
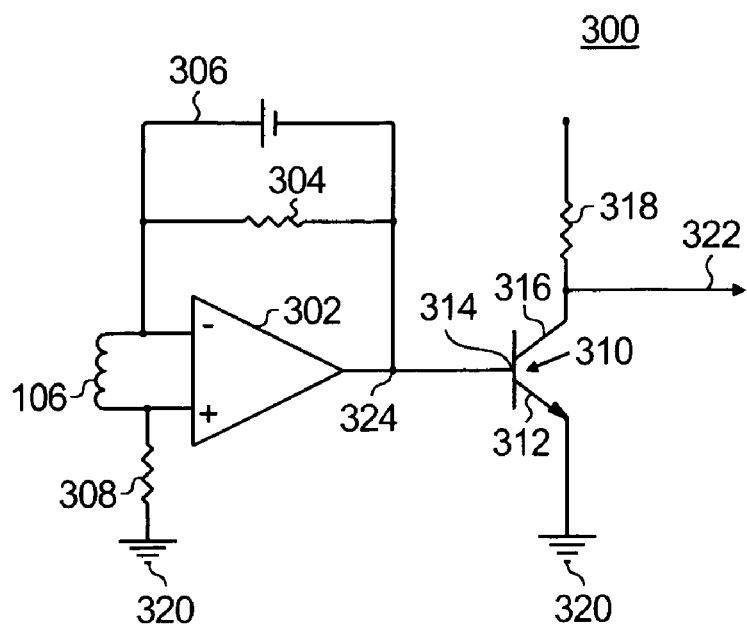
FIG. 3 is a schematic diagram of an embodiment used in accordance with the invention.

FIG. 3 depicts a schematic diagram of an electronic circuit 300 used in accordance with the invention. Electronic circuit 300 includes coil 106; operational amplifier ("op-amp") 302; resistors 304, 308, and 318; a capacitor 306; and a transistor 312. For illustrative purposes values suitable for some of the elements listed above are resistor 304 having a resistance of about 47 kohms; resistor 308 having a resistance of about 4.7 kohms; resistor having a resistance of about 318 is about 10 kohms; capacitor 306 having a capacitance of about 0.001 farads; and transistor 310 can be a transistor type commonly referred to as a "3904."

Coil 106 is coupled to op-amp 302. Resister 304 and capacitor 306 are connected in parallel and to the negative terminal of op-amp 302 and to the output of op-amp 302. The connection point of resistor 304 and capacitor 306 to the output of op-amp 302 is hereinafter referred as node 324. Resistor 308 is coupled to the positive terminal of op-amp 302 and to ground 320.

Also connected to node 324 is a base 314 of transistor 310. The emitter 312 of transistor 310 is coupled to ground 320. Resistor 318 is coupled to the collector 316 of transistor 310.

The circuit 300 is used when the scanner 100 is initially turned on; when the scanner 100 is initially turned off; at predetermined intervals (e.g., 1 ms intervals); and/or when initiated by a user.

When the flipper is not oscillating at the proper frequency, information is not scanned or not scanned at the proper rate. When data is received from the scanner along the optical path the assumption is that the flipper is oscillating at the controlled (i.e., the benchmark) frequency and that the laser beam is moving in accordance with the flipper. However, with this method you don't always get data even though the laser beam and flipper are moving. When the scanner is not transmitting or receiving information properly, an internal laser is turned off and the scanner is examined. The circuitry of FIG. 3 in conjunction with a method 400 is used to insure that the flipper oscillates at the desired frequency.

Returning to FIG. 3, when the scanner 100 is initially turned on; initially turned off, at predetermined intervals (e.g., 1 ms intervals); and/or when desired by a user, the laser is off and the circuitry 300 uses the coil 106 as a "sense" coil. In scanning operations, the coil 106 is used as a drive coil (i.e., the coil 106 is being driven by the push-pull driver). Because the motor is on even though the laser is off, the voltage generated by the coil 106 moves the magnetic element 208 back and forth.

Op-amp 302 amplifies the wave signal generated by the flipper coil 106 pair. Resistance 304 and capacitance 306 provide the frequency for the amplified wave. The resultant output can be measured at node 324 and can be in different wave forms. For example the wave form at node 324 can be a sine wave, a triangle wave, and a square wave.

The output at node 324 is coupled to the base 314 of the transistor 310 which ultimately is converted to a TTL level signal (i.e., 0v level and 5v level) and transmitted along pathway 322 for interpretation. The flipper, circuitry 300, and method 400 use the change (i.e., transition) from either 0v to 5v or 5v to 0v as indicative of movement (and cumulatively the oscillation frequency) of the flipper.

Figure 4:
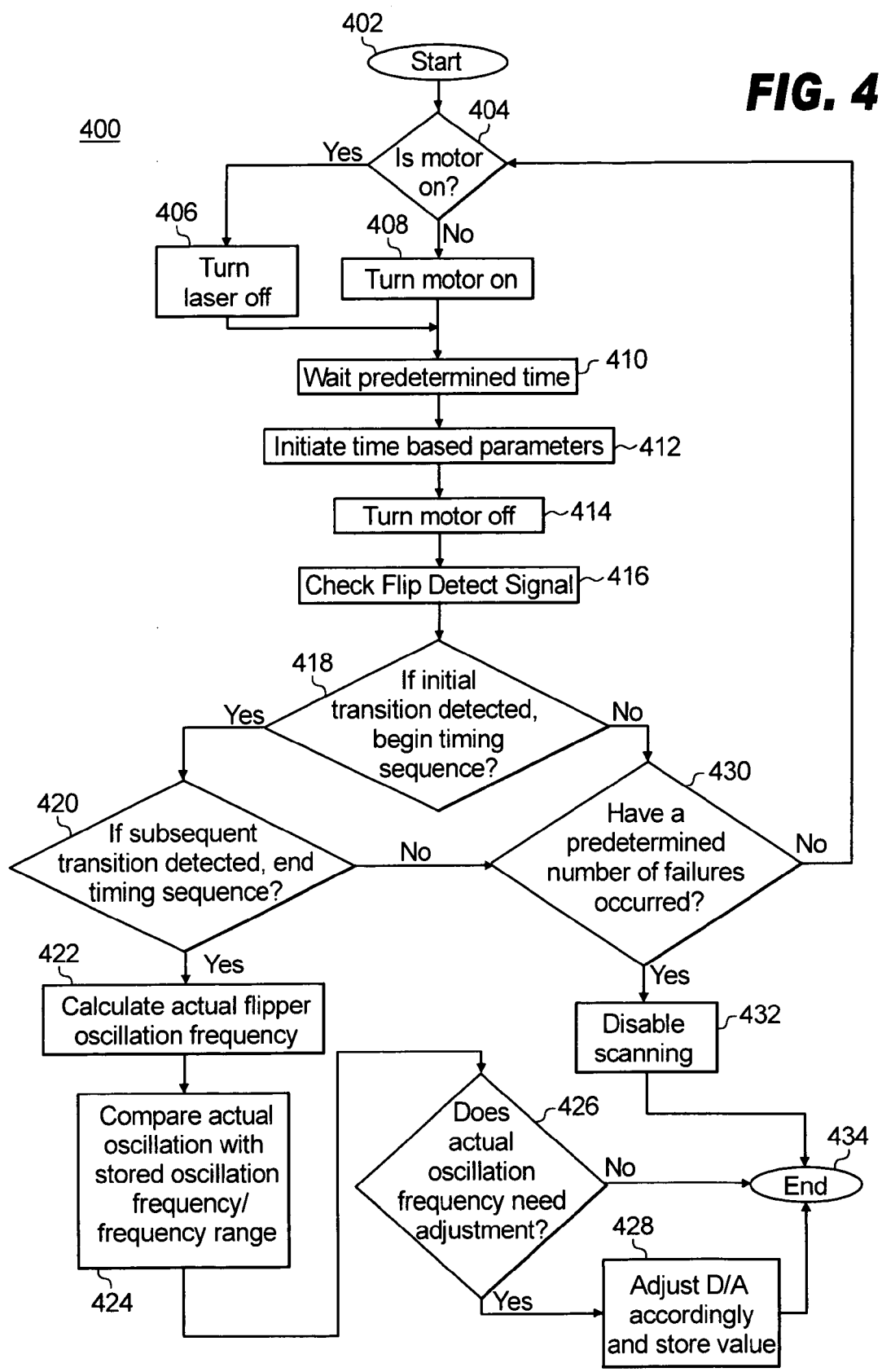
FIG. 4 depicts a method in accordance with the invention.

FIG. 4 is an exemplary of a flow diagram of a method 400 in accordance with the invention. The method 400 begins at step 402 and proceeds step 404.

At step 404 a determination is made as to whether the motor is on. If a negative determination is made, the method 400 proceeds to step 408. At step 408 the motor is turned on and proceeds to step 410.

At step 410, the method 400 waits (i.e., leaves the motor on) for a predetermined time interval. The time interval is sufficient to power the coil 106 so that the flipper should oscillate at the benchmark frequency at step 410 (i.e., after the motor is turned off). It is noted that when the method 400 is initiated when the scanner is turned off, the method 400 begins at step 410.

For example, the predetermined time may be enough time to power the coil 106 so that the flipper is flexed (i.e., bent at the flexible gap portion 206 which serves as a pivot) to and held at an angle θ (with respect to the flipper in the non-flexed position) until the method 400 proceeds to step 416. The angle θ can be a minimum angle which will provide enough potential energy in the flipper so that the flipper should oscillate, at step 416, at the benchmark frequency.

In addition, the predetermined time interval (e.g., about 50 ms) may also be for a time sufficient to power the coil 106 so that the flipper should oscillate at the benchmark frequency during steps 408, 410, and 414. Further, the predetermined time interval may also be for a time sufficient to power the coil 106 so that the flipper should oscillate at the benchmark frequency during steps 408, 410, 414, and 416. It is appreciated that the predetermined time for the motor to be turned on will vary with the power requirements needed to move the flipper.

If a step 404 an affirmative determination is made the method proceeds to step 406. At step 406 the laser is turned off. After the laser is turned off, the method 400 proceeds to step 410 as described above.

Before proceeding to step 414, the method 400 proceeds to step 412. At step 412, a time-based parameter module is initialized to analyze the flip detect signal. The module is stored in memory (described in greater detail in FIG. 5). Illustratively, some of the time based parameters can be: a timer to time an elapsed time between transitions; a benchmark elapsed time(s) between transitions; benchmark Digital to Analog Converter ("DAC") value(s); and equation(s) to calculate the actual oscillation frequency of the flipper from the transitions. Consecutive transitions can be used to calculate the pulse bandwidth.

After the time based parameter module is initialized and after the expiration of the predetermined time interval (e.g., 50 ms), the method 400 proceeds to step 414 where the motor is turned off. After the motor is turned off, the method 400 proceeds to step 416.

At step 416, the method 400 checks the flip detect signal (i.e., information indicative of the actual oscillation frequency of the flipper). Thereafter the method 400 proceeds to step 418.

At step 418, the method 400 checks the flip detect signal for an initial transition. If an initial transition is received, the timer timestamps the initial transition and the method 400 proceeds to step 420.

If, however, an initial transition is not detected at step 418, the method 400 proceeds to step 430. Because a transition signal is indicative of flipper movement, no detection of the initial transition is regarded as a flipper failure. At step 430 a counter determines how many times a failure to detect a transition has occurred. If the number of failures has not exceeded a predetermined number of times (e.g., 4 times) then the method 400 will proceed to step 408. Step 430 acts as an iterative counter which helps to insure that the method 400 makes several attempts (illustratively, three attempts) to make sure that the flipper, magnet, and coil combination are working improperly before indicating that the scanner is working improperly. Steps 418, 430, and 408 serve as one of the iterative loops to make the predetermined number of attempts. If the predetermined number of failures has been exceeded, the method 400 proceeds to step 432. At step 432, scanning is disabled.

At step 420 the method 400 determines whether a subsequent transition is detected. If a subsequent transition is detected, the timer timestamps the subsequent transition and proceeds to step 422. If a subsequent transition is not detected, the method 400 proceeds to step 430. Steps 430 and 408 operate as already described above. Steps 420, 430, and 408, cumulatively, are another iterative loop which attempts (for a predetermined number of times) to detect a transition signal before indicating that the flipper, magnet, and coil combination are working improperly.

At step 422, the method 400 uses information obtained from the flip detect signal to calculate the pulse bandwidth or actual oscillation frequency of the flipper. Illustratively, step 422 uses the time difference between the timestamps of the initial and subsequent transition signals to calculate the pulse bandwidth or actual oscillation frequency of the flipper. Thereafter, the method 400 proceeds to step 424.

At step 424, the method 400 compares information received from the flip detect signal with benchmark information. In one embodiment, the received information is used to calculate the actual oscillation frequency. Thereafter, the actual oscillation frequency is compared with the benchmark oscillation frequency stored in memory. Illustratively, the benchmark information is stored in a look-up table in memory.

In yet another embodiment, a direct comparison of the information received and the benchmark settings is made. A percentage deviation is calculated and checked against a maximum allowable deviation to determine if adjustment to the flipper oscillation frequency is needed.

It is appreciated that, in various embodiments, the benchmark information can be ranges (e.g., oscillation frequency ranges or lapsed times between transitions). It is also appreciated that in various embodiments, the method 400 may proceed from step 420 to step 424 without performing a calculation (i.e., without proceeding to step 422) on the information received from the flip detect signal. For example, when the method 400 compares the time between the received transition signals and benchmark transition signal values stored in the look-up table. After comparison, the method 400 proceeds to step 426.

At step 426 the method 400 determines whether the oscillation frequency of the flipper needs to be adjusted to fall within benchmark parameters. If a negative determination is made (i.e., the actual frequency of the flipper is within benchmark parameters) then the method 400 proceeds and ends at step 434.

If an affirmative determination is made at step 426, the method 400 proceeds to step 428. At step 428, the actual oscillation frequency of the flipper is adjusted so that the flipper oscillates within the desired parameters. The DAC is adjusted to likewise adjust the value of the drive current signal in coil 106. The adjusted DAC and drive current signal will bring the actual oscillation frequency of the flipper to the desired operating parameters (e.g., to the benchmark oscillation frequency/frequency range). After the DAC is adjusted, the DAC value is stored in the look-up table. Thereafter the method 400 proceeds and ends at step 434.

Figure 5:
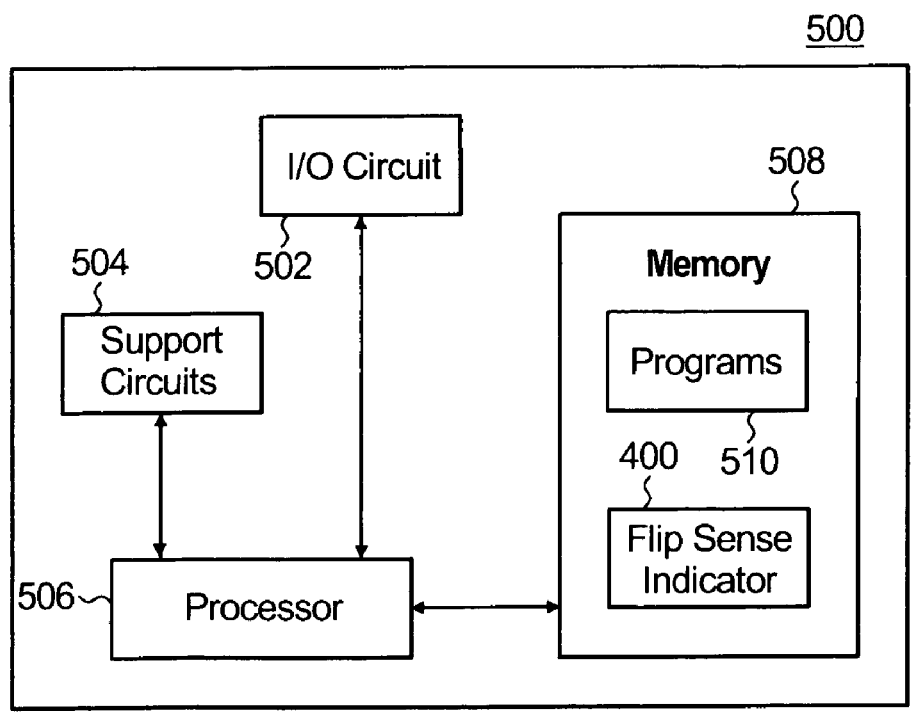
FIG. 5 depicts a high level block diagram of a computer architecture for performing an embodiment of the invention.

FIG. 5 depicts a high level block diagram of an embodiment of a controller 500 as part of the electronic circuitry 112 suitable for use in determining the actual oscillation frequency of the flipper depicted in FIGS. 1 and 2. The controller 500 of FIG. 5 comprises a processor 506 as well as a memory 508 for storing control programs and the like. The processor 506 cooperates with conventional support circuitry 504 such as power supplies, clock circuits, cache memory and the like as well as circuits that assist in executing the software routines stored in the memory 508. As such, it is contemplated that some of the process steps discussed herein as software processes may be implemented within hardware, for example, as circuitry that cooperates with the processor 506 to perform various steps. The controller 500 also contains input-output circuitry 502 that forms an interface between the various functional elements communicating with the controller 500. For example, the controller 500 communicates with the motor, coil, and flipper, as described above, to receive and interpret a voltage signal at TTL level (0v or 5v) for determining whether consecutive transitions have occurred.

Although the controller 500 of FIG. 5 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although various embodiments that incorporate the teachings of the present invention have been shown and described in detail herein, those skilled in the art can readily devise many other varied embodiments that still incorporate these teachings.

We claim:

1. A method comprising the steps of:
 (a) receiving a flip detect signal indicative of a flipper oscillation frequency, said receiving step further comprising:
  (a1) turning on a motor for driving said flipper;
  (a2) leaving said motor on for a predetermined time interval;
  (a3) turning said motor off; and
  (a4) while said motor remains off checking said flip detect signal;
 (b) comparing said flip detect signal with stored parameters; and
 (c) adjusting said flipper oscillation frequency when a percentage deviation between said flip detect signal and said parameters is above a predetermined value.

2. The method of claim 1 wherein said flip detect signal comprises a plurality of transitions.

3. The method of claim 2 further comprising:
 time-stamping said transitions; and
 calculating a pulse bandwidth from said time-stamps.

4. The method of claim 1 wherein said parameters comprises at least one of
 a benchmark oscillation frequency and
 a benchmark oscillation frequency range.

5. The method of claim 1 further comprising: performing steps (a), (b), and (c) when at least one of
 a scanner is turned on,
 said scanner is turned off,
 a lapse of a predetermined time interval, and
 an initiation by a user.

6. The method of claim 5 further comprising
 storing a new DAC value associated with said adjusted flipper oscillation frequency.

7. The method of claim 1 wherein said comparing further comprises:
 calculating a percentage difference between said flip detect signal and said parameters; and
 storing a Digital-to-Analog Conversion ("DAC") value, in memory, wherein said DAC value is used to control said adjusted flipper oscillation frequency.

8. The method of claim 1 further comprising:
repeating steps (a), (b), and (c) when said flip detect signal is indicative of no transition.

9. The method of claim 1 wherein said predetermined time interval is sufficient to flex and hold a flipper.

10. The method of claim 1 further comprising:
amplifying said flip detect signal wherein said flip detect signal is a magnetically induced voltage wave; and
converting said wave to a transistor transistor logic level (TTL) signal.

11. The method of claim 1 further comprising turning a laser off when said laser is on.

12. A computer-readable medium having stored thereon a plurality of instructions, the plurality of instructions including instructions which, when executed by a processor, cause the processor to perform the steps comprising of:
(a) receiving a flip detect signal indicative of a flipper oscillation frequency, said receiving step further comprising:
(a1) turning on a motor for driving said flipper;
(a2) leaving said motor on for a predetermined time interval;
(a3) turning said motor off; and
(a4) while said motor remains off checking said flip detect signal;
(b) comparing said flip detect signal with stored parameters; and
(c) adjusting said flipper oscillation frequency when a percentage deviation between said flip detect signal and said parameters is above a predetermined value.

13. The computer-readable medium of claim 12 wherein said flip detect signal comprises a plurality of transitions.

14. The computer-readable medium of claim 13 further comprising:
time-stamping said transitions; and
calculating a pulse bandwidth from said time-stamps.

15. The computer-readable medium of claim 12 wherein said parameters comprises at least one of
a benchmark oscillation frequency and
a benchmark oscillation frequency range.

16. The computer-readable medium of claim 12 further comprising:
performing steps (a), (b), and (c) when at least one of
a scanner is turned on,
said scanner is turned off,
a lapse of a predetermined time interval, and
an initiation by a user.

17. The computer-readable medium of claim 16 further comprising storing a new DAC value associated with said adjusted flipper oscillation frequency.

18. The computer-readable medium of claim 12 wherein said comparing further comprises:
calculating a percentage difference between said flip detect signal and said parameters; and
storing a Digital-to-Analog Conversion ("DAC") value, in memory, wherein said DAC value is used to control said adjusted flipper oscillation frequency.

19. The computer-readable medium of claim 12 further comprising:
repeating steps (a), (b), and (c) when said flip detect signal is indicative of no transition.

20. The computer-readable medium of claim 12 wherein said predetermined time interval is sufficient to flex and hold a flipper.

21. The computer-readable medium of claim 12 further comprising:
amplifying said flip detect signal wherein said signal is a magnetically induced voltage wave; and
converting said wave to a transistor transistor logic level (TTL) signal.

22. The computer-readable medium of claim 12 further comprising turning a laser off when said laser is on.

23. Apparatus comprising:
means for receiving a flip detect signal indicative of flipper oscillation frequency by turning on a motor for driving said flipper, leaving said motor on for a predetermined time interval, turning said motor off and, while said motor remains off, checking said flip detect signal;
means for comparing said flip detect signal with stored parameters; and
means for adjusting said flipper oscillation frequency when a percentage variation between said flip detect signal and said parameters is above a predetermined value.

24. The apparatus of claim 23 further comprising:
means for calculating a percentage difference between said flip detect signal and said parameters; and
means for storing a Digital-to-Analog Conversion ("DAC") value, in memory,
wherein said DAC value is used to control said adjusted flipper oscillation frequency.

25. The apparatus of claim 23 further comprising:
means for amplifying said flip detect signal wherein said signal is a magnetically induced voltage wave; and
means for converting said wave to a transistor transistor logic level (TTL) signal.

26. The apparatus of claim 23 further comprising:
means for performing said receiving, comparing, and adjusting when at least one of a scanner is turned on,
said scanner is turned off,
a lapse of a predetermined time interval, and
an initiation by a user.

27. The apparatus of claim 23 further comprising:
means for time-stamping said transitions; and
means for calculating a pulse bandwidth from said time-stamps.

28. The computer-readable medium of claim 23 further comprising turning a laser off when said laser is on.

* * * * *

UNITED STATES PATENT AND TRADEMARK OFFICE
CERTIFICATE OF CORRECTION

PATENT NO. : 7,614,561 B2  Page 1 of 1
APPLICATION NO. : 11/303860
DATED : November 10, 2009
INVENTOR(S) : Blake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Nineteenth Day of October, 2010

David J. Kappos
*Director of the United States Patent and Trademark Office*